(12) United States Patent
Croitoru et al.

(10) Patent No.: US 9,493,584 B2
(45) Date of Patent: Nov. 15, 2016

(54) POLY (PENTABROMOBENZYL ACRYLATE) HAVING SPECIFIC PROPERTIES

(71) Applicant: BROMINE COMPOUNDS LTD., Beer-Sheva (IL)

(72) Inventors: Bertha Croitoru, Beer-Sheva (IL); Dov Beruben, Beer-Sheva (IL); Michael Peled, Beer-Sheva (IL); Yaakov Rachmilevitch, Beer-Sheva (IL); Yaniv Hirschsohn, Rehovot (IL); Yelena Epshtein Assor, Beer-Sheva (IL); Ella Rapaport, Lachish Darom (IL); Dan Kopel, Beer-Sheva (IL)

(73) Assignee: BROMINE COMPOUNDS LTD., Be'er-Sheva (IL)

( * ) Notice: Subject to any disclaimer, the term of this patent is extended or adjusted under 35 U.S.C. 154(b) by 0 days.

(21) Appl. No.: 14/435,312

(22) PCT Filed: Oct. 17, 2013

(86) PCT No.: PCT/IL2013/000078
§ 371 (c)(1),
(2) Date: Apr. 13, 2015

(87) PCT Pub. No.: WO2014/061010
PCT Pub. Date: Apr. 24, 2014

(65) Prior Publication Data
US 2015/0259440 A1    Sep. 17, 2015

Related U.S. Application Data

(60) Provisional application No. 61/714,767, filed on Oct. 17, 2012.

(51) Int. Cl.

| | | |
|---|---|---|
| *C08F 2/10* | (2006.01) | |
| *C08F 220/14* | (2006.01) | |
| *C08L 33/14* | (2006.01) | |
| *C08L 23/14* | (2006.01) | |
| *C08L 25/06* | (2006.01) | |
| *C08L 33/16* | (2006.01) | |
| *D06M 15/263* | (2006.01) | |
| *C08F 220/24* | (2006.01) | |
| *C08F 212/08* | (2006.01) | |
| *D06M 101/06* | (2006.01) | |
| *D06M 101/32* | (2006.01) | |

(52) U.S. Cl.
CPC ............ *C08F 2/10* (2013.01); *C08F 220/24* (2013.01); *C08L 23/14* (2013.01); *C08L 25/06* (2013.01); *C08L 33/14* (2013.01); *C08L 33/16* (2013.01); *D06M 15/263* (2013.01); *C08F 212/08* (2013.01); *C08L 2201/02* (2013.01); *C08L 2203/12* (2013.01); *D06M 2101/06* (2013.01); *D06M 2101/32* (2013.01); *D06M 2200/30* (2013.01)

(58) Field of Classification Search
CPC ...... C08F 212/08; C08F 2/10; C08F 220/24; C08L 33/14; C08L 23/14; C08L 25/06; C08L 33/16; C08L 2201/02; C08L 2203/12; D06M 15/263; D06M 2101/06; D06M 2101/32; D06M 2200/30
USPC ....... 526/89, 224, 292.5, 319; 524/430, 551; 525/209; 523/222
See application file for complete search history.

(56) References Cited

U.S. PATENT DOCUMENTS

| | | | |
|---|---|---|---|
| 4,128,709 A * | 12/1978 | Vollkommer | C08F 20/22 260/DIG. 24 |
| 4,996,276 A | 2/1991 | Fishler et al. | |
| 5,387,636 A | 2/1995 | Landry et al. | |
| 6,028,156 A * | 2/2000 | Peled | C08F 120/06 526/208 |
| 6,503,988 B1 | 1/2003 | Kitahara et al. | |
| 2014/0121338 A1 | 5/2014 | Oren | |

FOREIGN PATENT DOCUMENTS

| | | |
|---|---|---|
| CN | 102 167 762 | 8/2011 |
| DE | 2 920 085 | 11/1980 |
| WO | WO 2010/010561 | 1/2010 |

OTHER PUBLICATIONS

International Search Report for PCT/IL2013/000078 mailed Jan. 2, 2014, two pages.
"FR-1025", *ICL Industrial Products*, http:/ /icl-ip.com / products/fr-1025/, printed Apr. 3, 2015, four pages.
J. Org. Chem 60 (16), 1995, pp. 5341-5345.

* cited by examiner

*Primary Examiner* — Michael M Bernshteyn
(74) *Attorney, Agent, or Firm* — Nixon & Vanderhye P.C.

(57) ABSTRACT

Poly (pentabromobenzyl acrylate) having weight average molecular weight (Mw) in the range from 4,000 to 120,000 and polydispersity index of less than 10 as determined by high temperature gel permeation chromatography, wherein the glass transition temperature of the poly (pentabromobenzyl acrylate) is not more than 150 C.°, the poly (pentabromobenzyl acrylate) includes chains which are terminated by an end group derived from a chain length regulator, wherein the end group is a thiol group —$SR_1$, and wherein $R_1$, is a linear or branched alkyl group composed of not less than 8 carbon atom.

16 Claims, 1 Drawing Sheet

POLY (PENTABROMOBENZYL ACRYLATE) HAVING SPECIFIC PROPERTIES

Figure 1:
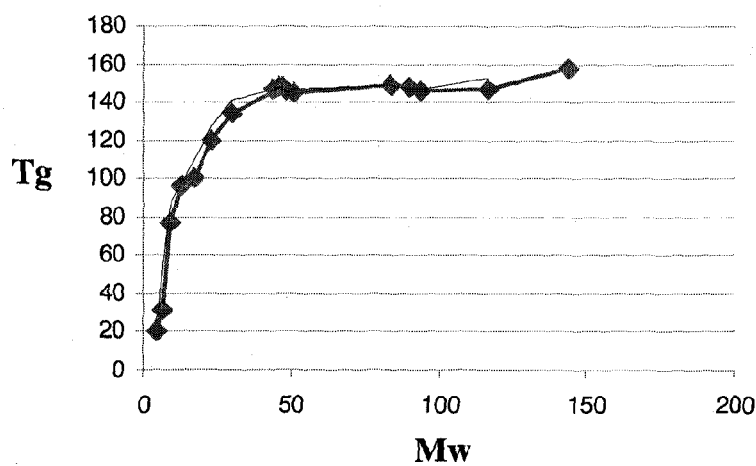

This application is the U.S. national phase of International Application No. PCT/IL2013/000078 filed 17 Oct. 2013 which designated the U.S. and claims the benefit of U.S. Provisional Application No. 61/714,767 filed 17 Oct. 2012, the entire contents of each of which are hereby incorporated by reference.

Pentabromobenzyl acrylate is a monomer useful for the production of poly (pentabromobenzyl acrylate), a polymer which is used as a flame retardant agent in flammable materials. The monomer and the polymer, abbreviated herein PBBMA and PBBPA, respectively, are represented by the following formulas:

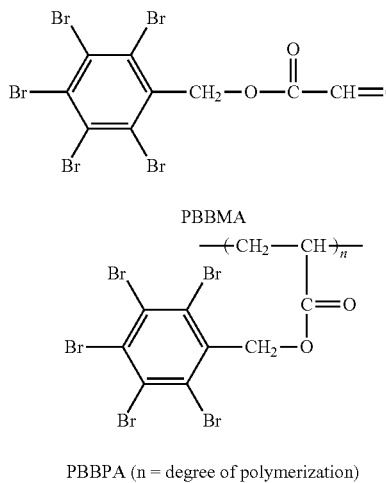

PBBPA (n = degree of polymerization)

The polymerization of PBBMA to form PBBPA can be accomplished either in bulk (in an extruder at a temperature in the range from 120° C. to 290° C. as described in U.S. Pat. No. 4,996,276), or in solution.

In solution polymerization, solvents must be chosen carefully. U.S. Pat. No. 4,128,709 describes a solution polymerization of PBBMA in methyl glycol. CN 102167762 describes the synthesis of the monomer PBBMA, following which the monomer undergoes polymerization in ethylene glycol monomethyl ether (i.e., the same solvent as in U.S. Pat. No. 4,128,709) in the presence of dicumyl peroxide as a free radical initiator. According to U.S. Pat. No. 6,028,156, aprotic solvents such as methyl ethyl ketone, ethyleneglycol dimethylether and dioxane were used for the solution polymerization, achieving reaction yields of not more than 80%. In a recently filed, co-assigned PCT/IL2012/000154 (WO 2012/140649) the polymerization of the monomer was carried out in halogenated aromatic solvents and specifically in chlorobenzene.

The aprotic solvents used in the process described in U.S. Pat. No. 6,028,159 were applied in an anhydrous form, i.e., the reaction solvent was devoid of water. It has now been found that the monomer pentabromobenzyl acrylate undergoes polymerization in solution in aqueous mixtures of water-miscible aprotic solvents (i.e., solvents which can neither donate nor capture proton in water). In the presence of an initiator (which is preferably water-soluble) and optionally a chain length regulator (i.e., a polymerization inhibitor) in the water-containing medium, the polymerization reaction is completed within a relatively short period of time, affording the polymer product in a good yield. The experimental results reported below indicate that the polymerization of PBBMA in solutions consisting of aprotic solvents and water is generally faster than corresponding polymerization reactions in the absence of water. The reaction is easily manageable and upon adjustment of the ratio between the monomer and chain length regulator it is possible to control the molecular weight of the product. The novel polymer obtained according to the invention is characterized by good thermal stability, narrow molecular weight distribution and relatively low glass transition temperature, and is useful for reducing the flammability of some important flammable materials, as reported in detail below.

The invention therefore primarily relates to a solution polymerization process comprising polymerizing a monomer of the formula:

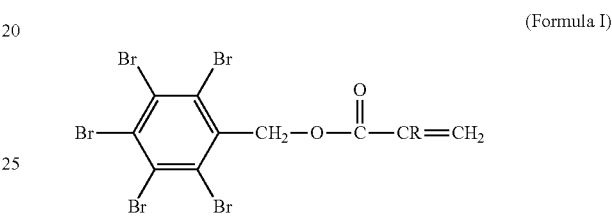

(Formula I)

wherein R is H or methyl, indicating the monomers pentabromobenzyl acrylate or pentabromobenzyl methacrylate, respectively, in a mixture of water-miscible aprotic solvent and water, in the presence of a free radical initiator, optionally in combination with a chain length regulator.

In the case of homopolymerization of pentabromobenzyl acrylate or pentabromobenzyl methacrylate, the products formed are poly(pentabromobenzyl acrylate) and poly (pentabromobenzyl methacrylate), respectively, which may have an end group depending on the chain terminator chosen. It should be noted, however, that the polymerization according to the invention may take place when two or more different monomers are present in the solution to form copolymers with a first repeating unit, which corresponds to either pentabromobenzyl acrylate or pentabromobenzyl methacrylate, and a second repeating unit, which is either capable of undergoing bromination (e.g., a styrene group) or is derived from a monomer which is a bromine-containing polymerisable compound (e.g., brominated styrene and tribromoneopentyl acrylate ester), again with an end group as set forth above.

By the term "water-miscible solvent" is meant a solvent, which can be added to water in an amount of at least 1 g per 100 g water with no phase separation. As noted above, the reaction medium employed in the polymerization process of the invention consists of an organic solvent, which is water-miscible aprotic solvent, and water, preferably at weight ratios in the range from 10:1 to 1:1, more preferably from 5:1 to 1:1, e.g., from 4:1 to 2:1. The water-miscible aprotic solvent is preferably selected from the group consisting of linear, branched or cyclic ethers. Glycol ethers, namely, the group of solvents based on dialkyl ethers of ethylene glycol and diethylene glycol, are especially preferred. Exemplary solvents include the dimethyl ether of ethylene glycol [i.e., 1,2-dimethoxyethane (abbreviated EGDME); also known as glyme] and the dimethylether of diethylene glycol (also know as diglyme). Cyclic ethers such as tetrahydrofurane and 1,4-dioxane are also suitable for use in the invention. Other classes of water-miscible aprotic solvents which may be used are ketones and esters (e.g., ethyleneglycol diethylacetate). Preferred solvents have the formulas $R^1$—OCH$_2$CH$_2$O—$R^2$ or $R^1$—OCH$_2$CH$_2$—O—CH$_2$CH$_2$O—$R^2$ wherein $R^1$ and $R^2$ are independently selected alkyl groups (e.g., C1-C4 alkyl groups) or C(O)CH$_3$.

It should be noted that the solubility of the monomer in an aqueous mixture of a water-miscible aprotic solvent is generally lower than in the organic solvent alone. For example, the solubility of PBBMA in EGDME is 1 g/6 ml, while the solubility of the monomer in a 3:1 mixture of EGDME and water is 0.3/6 ml. Still, despite the presence of water, the polymerization reaction advances effectively.

In general, the polymerization of PBBMA in the water-containing medium according to the invention is carried out with stirring under heating, preferably at a temperature in the range from 70° C. to the reflux temperature. It should be noted that the reaction is generally carried out under atmospheric pressure. The concentration of the monomer is preferably from 10 to 70 wt %, more preferably from 50 to 60 wt % relative to the mixture of the organic solvent and water.

The polymerization reaction is accomplished in the presence of an initiator, namely, a free radical initiator which exhibits good solubility in the aqueous solvent mixtures. By the term "water-soluble initiator" is meant an initiator whose solubility in water at 20° C. is at least 1 g/liter, e.g., at least 20 g/liter, and even more specifically, at least 200 g/liter. To this end, water soluble persulfate (—O$_3$SOOSO$_3$—) salts are especially preferred. Utilizable persulfates include potassium persulfate (27 g/l at 20° C.), sodium persulfate (238 g/l at 20° C.) and ammonium persulfate (228 g/l at 20° C.). Water soluble peroxides and hydroperoxides, as described in J. Org. Chem 60 (16), p. 5341-5345 (1995), can also be used. Water soluble free radical initiators operative in the present invention may be also selected from the class of Redox initiators, namely, a pair of initiators consisting of water soluble oxidant (e.g., a persulfate salt) in combination with a water soluble reductant (metabisulfite salt). Other useful thermal initiators may be selected from the group of water-soluble azo compounds, such as 2,2'-azobis-(2-amidinopropane.HCl). The initiator loading is preferably between 0.01 and 10% w/w based on the monomer, preferably about 0.5 to 5%, e.g. about 1%.

As noted above, in one embodiment of the invention, the polymerization reaction of PBBMA is carried out in the presence of a combination of a free radical initiator and a chain length modifier/regulator. The weight ratio between the initiator and the chain length modifier can vary within a broad range, for example, from 1:1 to 1:20. The higher the ratio (in favor of the chain length modifier), the shorter the polymer chains formed, i.e., poly(pentabromobenzyl acrylate) with low weight average molecular weight and narrow molecular weight range can be obtained on increasing the amount of the chain length modifier. Thus, the degree of polymerization and molecular weight distribution of poly (pentabromobenzyl acrylate) are controlled by suitably adjusting the amount of the chain length regulator in the solution.

Preferable chain length regulators are sulfur containing compounds, in particular thiol compounds (R$_1$SH, wherein R$_1$ indicates an organic moiety, e.g. R$_1$ is an alkyl group composed of not less than 8 carbon atoms). For this purpose, mercapto-compounds, especially hydrocarbylmercaptans with 8-20 carbon atoms per molecule are preferred. Suitable examples include n-dodecyl mercaptan, n-octyl mercaptan, tertiary dodecyl mercaptan, tertiary nonyl mercaptan, tertiary hexadecyl mercaptan, tertiary octadecyl mercaptan, tertiary eicosyl mercaptan, secondary octyl mercaptan, secondary tridecyl mercaptan, cyclododecyl mercaptan, cyclododecadienyl mercaptan, aryl mercaptan like 1-naphthalene thiol etc. Mixtures of these compounds may also be used. The amount of the sulfur-containing chain length regulators may vary within a broad range, dependent on the solvent chosen and other variables related to the polymerization. 0.01 to 20 parts by weight of a chain length modifier, e.g., 0.01-10 (per 100 parts of the monomer) can be used. Sterically hindered phenols-containing compounds known as antioxidants can also be used as polymerization inhibitors/chain length regulators, in view of their ability to act as radical scavengers. An exemplary compound of this class is available under the name Irganox® 1010 (chemical name: Hydrocinnamic acid, 3,5-di-tert-butyl-4-hydroxy-,neopentanetetrayl ester) shown below:

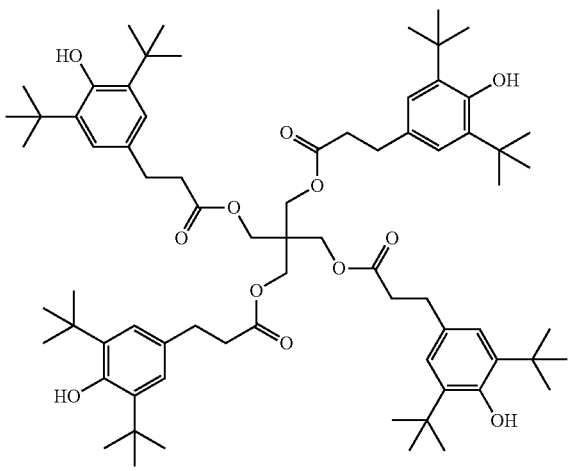 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

The polymerization is carried out by charging a reaction vessel with suitable amounts of the aprotic organic solvent, water, the monomer and the auxiliaries (the initiator and the chain length regulator), and maintaining the reaction mixture under heating (e.g., at the reflux temperature) for a sufficient time in order to allow the reaction to reach completion. The progress of the reaction can be monitored by high pressure liquid chromatography (HPLC) for the disappearance of the monomer. In the presence of an initiator, the polymerization reaction typically lasts not more than 120 minutes, e.g. between 60 and 90 minutes. The addition of a chain length modifier slows down the reaction. However, it is still possible to complete the reaction reaching a quantitative yield within an acceptable period of time, e.g. within less than four hours, e.g. at about 3 hours.

Upon completion of the polymerization, the reaction mixture is cooled whereby the product precipitates. The solid polymer is easily separable from the reaction mixture and can be recovered using conventional techniques, e.g., filtration or solvent evaporation etc. The solid polymer is washed with water and dried to constant weight.

A preferred poly (pentabromobenzyl acrylate) formed by means of solution polymerization of pentabromobenzyl acrylate according to the invention has weight average molecular weight (Mw) in the range from 4,000 to 199,000, more specifically from 4,000 to 198,000, and number average molecular weight (Mn) in the range from 5,000 to 20,000, with polydispersity index (PD), defined as the ratio Mw/Mn, of less than 18, preferably less than 15 and more preferably less than 10 e.g., from 2 to 10, e.g., from 5 to 10 and in some cases from 2 to 5, based on high temperature gel permeation chromatography (in 1,2,4-trichlorobenzene at 120° C.) reported in detail below. The polydispersity index serves as an indication of the breadth of molecular weight distribution of a polymer product.

In the presence of a chain length regulator which inhibits the growth of polymer chains, poly (pentabromobenzyl acrylate) products having relatively low Mw values are formed, i.e., between 4,000 and 120,000, with polydispersity index in the range from 2 to 15 (e.g., from 2 to 10). More specifically, the novel poly (pentabromobenzyl acrylate) provided by the invention have molecular weight in the range from 4,000 to 120,000, polydispersity index in the range from 2 to 10 (e.g., from 2 to 5, and even more specifically from 2 to 3) and glass transition temperature ($T_g$) measured by differential scanning calorimetry (DSC), and indicated by the midpoint temperature in the DSC plot, of less than 150° C., i.e., from 20 to 150° C.

Preferred novel PBBPA of the invention have Mw in the range from 4,000 to 90,000, a polydispersity index between 2 and 10 and a glass transition temperature between 20 and 150° C.; these preferred PBBPA can be divided into two groups as set forth in the table below:

| Group | Mw | PD | $T_g$ |
|---|---|---|---|
| A | 4,000-30,000 (e.g., 4,500-25,000) | 2-10 (e.g., 2-5) | 20-135° C. |
| B | 30,000-90,000 (e.g., 30,000-80,000) | 2-10 (e.g., 2-5) | 135-150° C. |

FIG. 1 shows a plot of the glass transition temperature of the PBBPA versus its molecular average molecular weight. As shown in the plot, the $T_g$ increases sharply as the Mw increases in the interval between 4,000 and 30,000. A slow variation of the $T_g$ is observed when the Mw is increased from 30,000 to 120,000. PBBPA of Groups A and B, with the characteristics set forth in the table above, constitute additional aspects of the invention. In particular, in the interval from 40,000 to 90,000, the $T_g$ lies in a narrow range of 140-150° C.

As shown in more detail below, PBBPA of Group A is effective, for example, in reducing the flammability of polypropylene, especially talc-free polypropylene copolymer systems. PBBPA of Group B is effective as a flame retardant in, inter alia, styrene-containing polymers and textile products. It should be noted that despite a significant variation in molecular weight, the PBBPA of Group B exhibits an essentially constant $T_g$, which matches well with the softening temperature of polyester sieves and drying temperatures employed in the textile industry, as demonstrated below.

The poly (pentabromobenzyl acrylate) of the invention may comprise chains terminated by a chemical unit which corresponds to the chain length regulator employed in the polymerization reaction. For example, when thiols of the formula $R_1SH$ are used to control the growth of the polymer, then the poly (pentabromobenzyl acrylate) comprises chains where the end group(s) is (are) —$SR_1$, wherein $R_1$ is preferably a linear or branched alkyl group composed of not less than 8 carbon atoms, e.g., a linear alkyl group of the formula —$(CH_2)_nCH_3$ wherein n is from 8 to 20. In one embodiment of the invention, the polymer comprises chains which are terminated by at least one end group of the formula —$S(CH_2)_{11}CH_3$, which corresponds to n-dodecyl thiol. The presence of —$S(CH_2)_nCH_3$ groups covalently attached to the end(s) of PBBPA chains can be determined by $^1$H-NMR analysis, as demonstrated below.

The thermal stability profile of preferred poly (pentabromobenzyl acrylate) of the invention, as indicated by thermogravimetric analysis (TGA), which measures the weight loss of a sample as sample temperature is increased, is typically as follows:

| | temperature | | |
|---|---|---|---|
| | T1 ≥ 305° C. | T2 ≥ 320° C. | T3 ≥ 330° C. |
| % weight loss | 2.0 | 5.0 | 10.0 |

Or more preferably as follows:

| temperature | T1 ≥ 315° C. | T2 ≥ 330° C. | T3 ≥ 340° C. |
|---|---|---|---|
| % weight loss | 2.0 | 5.0 | 10.0 |

Thus, in some embodiments, PBBPA is provided which exhibits 2% weight loss at not less than 305° C. (e.g., ≥315° C.), 5% weight loss at not less than 320° C. (e.g., ≥330° C.) and/or 10% weight loss at not less than 330° C. (e.g., ≥40° C.)

The polymer obtainable by solution polymerization in aqueous mixtures of aprotic solvents is of high purity, containing low level of the residual monomer, i.e., less than 1.0% by weight.

It should be noted that the commercially-used process for preparing the presently sold PBBPA (FR-1025) involves the bulk polymerization of PBBMA in a twin-screw extruder. High temperature gel permeation chromatography analysis of commercial FR-1025 by the method set out below indicates Mw above 400,000 and high polydispersity index, e.g., above 20.

The PBBPA of the invention is useful as a flame retardant agent in a flammable material. Accordingly, another aspect of the present invention is a flame-retarded formulation which comprises a flammable material and the novel PBBPA of the invention. In particular, the PBBPA of the invention exhibits good activity in polypropylene impact copolymers, styrene-containing polymers such as high impact polystyrene (HIPS) and acrylonitrile butadiene styrene (ABS), polyesters like PBT and in textile applications.

Conventional additives may also be included in the polymeric formulation of the invention. For example, an inorganic compound (typically a metal oxide) capable of cooperating with the PBBPA for retarding the flammability of the polymeric formulation is preferably also present in the formulation. A preferred example of a suitable inorganic compound, which is generally considered as an "inorganic synergist", is antimony trioxide. Other illustrative additives include fillers, antioxidants, heat stabilizers, UV stabilizers and pigments.

The formulation of the invention comprises a flame-retarding effective amount of the novel PBBPA described above. The precise amount of the PBBPA in the formulation is adjusted in order to achieve the desired level of flame retardancy. The flammability characteristics of plastic materials are quantifiable according to the method specified by Underwriter Laboratories standard UL 94. The UL 94 ratings are V-0, V-1, and V-2. A material assigned with the V-0 rating is considered to be the least flammable. For certain applications the lower V-2 rating is acceptable, whereas for other applications the more strict V-1 and V-0 ratings are needed. A formulation according to the invention which contains between 4 and 20% weight percent bromine, preferably between 7 and 18% of bromine, would generally satisfy at least the UL 94 V-2 burning test (the entire bromine content being supplied by the PBBPA). Unless otherwise indicated, the concentrations indicated herein are weight concentrations calculated relative to the total weight of the formulation.

Another aspect of the invention is a flame-retarded formulation comprising a polypropylene copolymer or impact modified polypropylene, and the PBBPA of the invention. The formulation comprises from 50 to 80% by weight of said polypropylene. The polypropylene impact copolymer can be in the form of block copolymers comprising a first block (or phase), which is essentially the polypropylene homopolymer component and a second block (or phase), which is an ethylene-propylene copolymer component. A polypropylene impact copolymer is produced by means of sequential polymerization reactions under conditions known in the art. The first reaction produces the homopolymer component and the second reaction produces the copolymer component. Thus, the copolymer component is chemically incorporated within the matrix of the homopolymer component. Different grades of polypropylene impact copolymer in the form of block copolymers are commercially available (Carmel Olefins, Israel, under the name Capilene® SE 50E, TR 50 and SL 50). Impact modified polypropylene can be prepared by admixing a polypropylene homopolymer and a rubber.

Notably, as illustrated herein below, V-2 rated polypropylene formulation based on polypropylene impact copolymer or impact modified polypropylene is attainable by the addition of the PBBPA of the invention such that the bromine content of the formulation is less than 10 wt %, e.g., from 5 to 10%, and more specifically, from 7 to 10 wt %, in combination with an inorganic synergist (e.g., antimony trioxide), with the ratio between the PBBPA and the synergist being less than 4:1, e.g., from 4:1 to 2:1, e.g., around 3:1. Polypropylene formulations comprising the PBBPA of the invention, wherein the bromine content of the formulation is in the range from 7 to 10 wt % and the bromine/$Sb_2O_3$ weight ratio is less than 4:1, meeting the UL 94 V-2 classification, constitute another aspect of the invention.

The experimental results reported below also indicate that PBBPA of Group A (4,000<Mw<30,000, especially with Mw in the range from 4,500 to 25,000) demonstrates good performance in polypropylene copolymer formulations, in particular in talc-free compositions. Talc-free polypropylene formulations comprising the PBBPA of Group A and antimony trioxide, such that the combined concentration of bromine and antimony trioxide is less than 34 wt %, and preferably less than 33 wt %, e.g., from 30 to 32, with the bromine/$Sb_2O_3$ weight ratio being not more than 2:1, meeting the UL 94 V-1 or V-0 classification, constitute a specific aspect of the invention.

Another aspect of the invention is a flame-retarded formulation comprising one or more styrene-containing polymers and copolymers, and the PBBPA of the invention. The formulation typically contains from 50 to 80 wt % of said styrene-containing polymers. The latter term, as used herein, refers to polymers, and specifically copolymers (including terpolymers), which contain (optionally substituted) styrenic structural unit, however combined with one or more other structural units. HIPS and ABS which can be flame retarded by the PBBPA of the invention are described, for example, in WO 2010/10561. HIPS and ABS compositions of the present invention also include one or more anti-dripping agents such as polytetrafluoroethylene (abbreviated PTFE) in a preferred amount between 0.025 and 0.4 wt %, more preferably between 0.025 and 0.3 wt %, and even more preferably between 0.05 and 0.2 wt %. PTFE is described, for example, in U.S. Pat. No. 6,503,988.

The novel PBBPA products of the invention, especially the PBBPA of Group B, demonstrate good activity in styrene-containing polymers such as HIPS and ABS when combined with a relatively small amount of an inorganic synergist. It is known that in the presence of an inorganic synergist such as antimony trioxide in the formulation, the quantity of the brominated flame retardant needed to achieve a specific level of flame retardancy can be reduced. Generally, the concentration of an inorganic synergist such as antimony trioxide needed to support the activity of brominated flame retardants in styrene-containing polymers in order to attain UL 94 V-0 rating is not less than 2 wt %. See, for example, U.S. Pat. No. 5,387,636 where HIPS formulations are described that are flame-retarded with decabromodiphenyl ethane in combination with 4% wt antimony trioxide. WO 2010/010561 reports a study which demonstrates that in general, reaching UL 94 V-0 rated HIPS formulations with antimony trioxide content as low as 1 wt % is feasible provided that the amount of bromine in the composition is not less than 19 wt %, as shown in WO 2010/010561 in respect to two strong flame retardants, decabromodiphenyl oxide and decabromodiphenyl ethane. Only one flame retardant, tris(2,4,6-tribromophenoxy)-s-triazine, (commercially known as FR-245), emerged from the study reported in WO 2010/010561 as a flame retardant which performs exceptionally well in HIPS and ABS in the presence of a low antimony trioxide content.

Hereinafter, the weight concentration of bromine supplied by a specific brominated flame retardant in the formulation is designated bromine$_{(FR\ name)}$. The concentration of antimony trioxide is abbreviated [$Sb_2O_3$]. The foregoing results based on the study reported in WO 2010/010561 are graphically shown in FIG. 2, where the bromine$_{(FR\ name)}$ needed to achieve UL 94 V-0 rated formulation is plotted versus [$Sb_2O_3$] (% ATO abscissa) for the three flame retardants mentioned above: decabromodiphenyl ethane (S-8010®; Albemarle Corporation), decabromodiphenyl oxide (FR 1210; ICL-IP) and FR 245 (ICL-IP).

Figure 2:
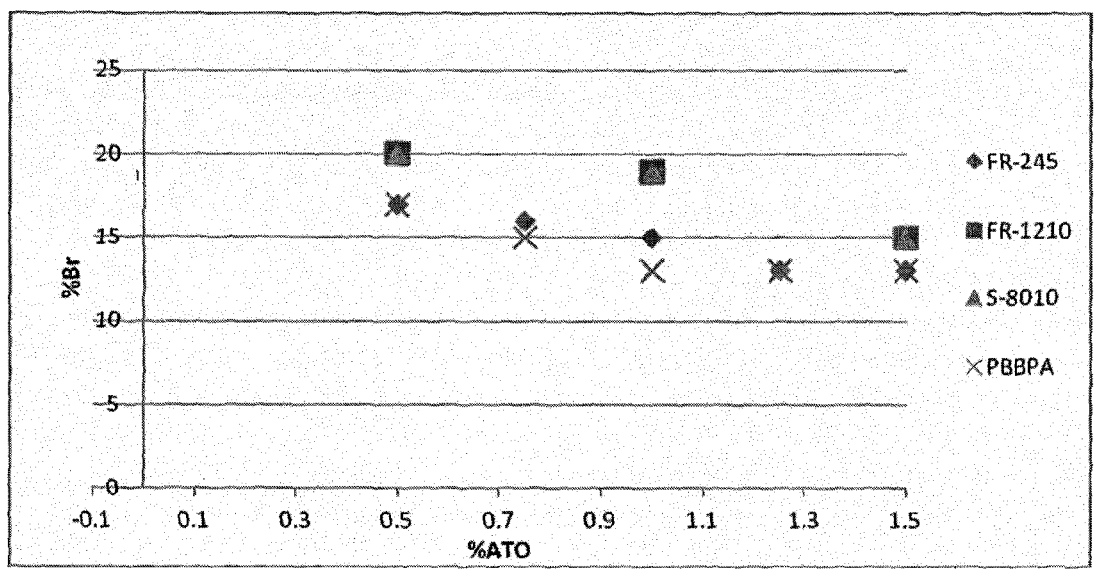

Surprisingly, the PBBPA of the invention, especially the PBBPA of Group B having Mw between 30,000 and 90,000 and polydispersity index in the range from 2 to 10 (e.g., from 2 to 5), demonstrates excellent utility in styrene-containing polymers in the presence of low quantity of antimony trioxide. As shown in FIG. 2, the novel PBBPA is at least as equally good as FR 245, when the antimony trioxide is confined within the range from 0.5 to 1.5 wt % of the styrene-containing polymer composition. A formulation comprising a styrene-containing polymer such as HIPS or ABS, antimony trioxide at a concentration of not more than 1.5 wt % (e.g., from 0.5 to 1.5 wt %), the PBBPA of the invention (such that bromine$_{(PBBPA)}$ is preferably less than 18%, e.g., from 17% to 13%), and preferably also an anti-dripping agent such as PTFE, forms another aspect of the invention.

The plastic formulations set forth above are readily prepared by methods known in the art. The various ingredients of the formulation are blended together, according to their respective amounts. The ingredients may be first dry blended using suitable mixing machines, such as Henschel mixer. The resulting mixture may then be processed and compounded to form homogeneous pellets, for example, by using a twin screw extruder. The pellets obtained are dried, and are suitable for feed to an article shaping process such as injection molding. Other blending and shaping techniques can also be applied.

The PBBPA of the invention also performs very well in reducing the flammability of textile products such as filament, staple, yarn, fiber, fabrics, knits, cloths, carpets and the like. The textile products can be of natural and/or synthetic origin (for example, cotton, polyester and blends thereof). The PBBPA of the invention can be applied on the textile product employing conventional methods, for example, by forming a coating layer onto one surface of the product (known as back-coating) or by means of padding techniques.

For these purposes, the PBBPA of the invention is dispersed in an aqueous carrier, in the presence of a binder suitable for use in coatings etc. Thus, a composition comprising the PBBPA (especially the Group B identified above, characterized by 30,000<Mw<80,000 and 135°<$T_g$<150), an aqueous carrier and a polymer binder, and preferably also one or more acceptable additives such as a wetting agent (for example, sodium diisopropyl naphthalene sulfonate, available from BYK) a dispersant (e.g., a linear alkyl/tertiary amine poly methacrylate block copolymer) and a thickener (e.g., hydroxyethylcellulose), forms another aspect of the invention. Preferably, the composition comprises an inorganic flame retardant synergist such an antimony trioxide.

More specifically, in order to form the PBBPA dispersion, the PBBPA of the inventions is subjected to particle size reduction, e.g., by means of dry milling, to produce a particulate PBBPA with the following particle size distribution: $D_{50}$ of less than 10 μm and $D_{90}$ of less than 15 μm. The pulverized PBBPA is then combined with a previously prepared aqueous mixture where one or more wetting agents and dispersants are present. The so formed dispersion is subjected to stirring (for example, at 500-1000 rpm) for not less than 30 minutes. The concentrations of the PBBPA, wetting agent and dispersant in the aqueous dispersion are in the ranges from 13-20 wt %, 0.1-0.2 wt % and 1-2 wt %, respectively, calculated on the basis of the total weight of the dispersion.

A polymer suitable for use in binding, coating and similar applications is then added to the dispersion under constant stirring. For example, the polymer is an acrylic polymer which is normally applied in the form of acrylic latex. The concentration of the acrylic binder in the composition of the invention is preferably between 10 and 20 wt %, e.g., from 11 to 19, calculated on the basis of the total weight of the dispersion.

Concurrently with the incorporation of the binder in the dispersion, an inorganic synergist which is commonly used to support the activity of brominated flame retardants, e.g., antimony trioxide, is preferably also added to the dispersion. The molar ratio between the bromine and antimony trioxide in the dispersion is preferably from 6:1 to 2:1, more preferably around 3:1. The viscosity of the dispersion is preferably in the range from 50 to 5000 cps and can be readily adjusted by adding a thickening agent.

The PBBPA composition described above is applied to the textile material and cured using conventional techniques. For example, the amount of PBBPA added to the fabric is in the range from 10 to 50% on fabric basis weight.

The invention also relates to a method for reducing the flammability of a textile product, comprising applying PBBPA (especially the PBBPA of Group B, with Mw in the range from 30,000 to 80,000, polydispersity index (abbreviated herein PD) between 2 and 10, preferably from 2 to 5, and 135°<$T_g$<150) to said product, for example, by padding or coating a surface of the product. A textile product comprising said PBBPA is also part of the invention.

EXAMPLES

Methods

High Temperature Gel Permeation Chromatography

HT GPC instrument (Malvern Instruments Ltd.) that includes HT-GPC Viscotek module 350A, two VE 1122 solvent delivery systems, HT stirred autosampler 430 model and OmniSec 4.7.0 analysis software was used to determine the molecular weight distributions of the polymer product. The instrument is equipped with refractive index (RI), viscometric (Visc), Low Angle Light Scattering (LALS) and Right Angle Light Scattering (RALS) detectors. Samples were dissolved in 1,2,4-trichlorobenzene (TCB), stabilized with 2,6-Di-tert-butyl-4-methyl-phenol (BHT), at 120° C. Ca. 8 mg/ml PBBPA solutions were prepared. 200 μL of the sample solution were injected into GPC columns. A series of two columns (2× Tosoh TSK-GEL GMHhr-H(S) HT 7.8 mm×30.0 cm, 13 μm GPC columns) connected consecutively was used. TCB at 120° C. was used as the mobile phase with a flow rate of 1.0 ml/min. Polystyrene Calibration Standards kit TDS 2000 were used for the calibration of the HT GPC. OmniSec software was used for the calculation of the Mn and Mw of the tested samples.

Preparation of the Standard Solutions:
1) Add 0.5 gram of BHT per 1 liter of TCB and shake well.
2) Filter TCB stabilized solution through GF/F 47 mm diameter, 0.7 μm glass microfiber filter Cat No. 1825047.
3) Use Malvern PS standards kit for calibration and verification of system suitability.
4) Add exactly 10 ml of stabilized TCB solution to both (99 KD and 325 KD) polystyrene standard vials. Add magnetic stirrer.
5) Hold standard solution stirred at 120° C. at least 30 minutes prior to injection.

Preparation of the Sample Solution:
1) Weigh 80 mg of sample into HT-GPC glass vials.
2) Add magnetic stirrer and stir at 120° C. at least 30 minutes prior to injection.

Injection volume was 0.2 ml and run time was 60 minutes.

TGA Analysis:

The TGA analysis was performed by a Mettler-toledo instrument model 850. 10 mg sample were heated in aluminum oxide crucible from room temperature to about 450° C. with heating rate of 10° C./min in an air atmosphere.

DSC Analysis:

The DSC analysis was performed with a Mettler-toledo instrument model 1821E. Samples were heated in aluminum oxide crucible from room temperature to about 450° C. at a heating rate of 10° C./min.

Example 1

Polymerization of Pentabromobenzyl Acrylate

Reaction medium: ethyleneglycol dimethylether/water mixture (3:1)
Initiator: ammonium persulfate A 2 L reactor equipped with mechanical stirrer, condenser and thermometer was charged with 500 g of PBBMA, 750 ml of ethyleneglycol dimethylether and 250 ml of water. To this mixture was added 5 g of ammonium persulfate and the contents of the reactor was heated to reflux (80° C.). The reaction was monitored by HPLC by consumption of the PBBMA. After three hours, the reaction was over. After cooling to room temperature, the solid is filtrated, washed with water and dried to constant weight in an oven vacuum at 120° C., giving PBBPA in almost quantitative yield. The bromine content as determined by parrbomb method is 70.3%.

TGA analysis indicates that under heating rate of 10° C./min in air atmosphere, the polymer undergoes the following weight losses:

TABLE 1

| temperature | T1 = 324° C. | T2 = 340° C. | T3 = 348° C. |
|---|---|---|---|
| % weight loss | 2.0 | 5.0 | 10.0 |

DSC analysis indicates that the Tg is at 168° C. The molecular weight was determined by HT GPC as set forth above and was estimated at 295,000 (Mw) and the number average of the molecular weight at 17,500 (Mn). The residual monomer was less than 0.8%.

Example 2

Polymerization of Pentabromobenzyl Acrylate

Reaction medium: ethyleneglycol dimethylether/water mixture (3:1)
Initiator: ammonium persulfate
Chain length regulator: dodecylmercaptan A 2 L reactor equipped with mechanical stirrer, condenser and thermometer was charged with 500 g of PBBMA, 750 ml of ethyleneglycol dimethylether and 250 ml of water. To this mixture was added 5 g of ammonium persulfate and 5 g of dodecylmercaptan and the contents of the reactor was heated to reflux (80° C.). The reaction was monitored by HPLC by consumption of the PBBMA. After three hours, the reaction was over. After cooling at room temperature, the solid is filtrated, washed with water and dried to constant weight in an oven vacuum at 120° C., giving PBBPA in almost quantitative yield.

TGA analysis indicates that under heating rate of 10° C./min in air atmosphere, the polymer undergoes the following weight losses:

TABLE 2

| temperature | T1 = 318° C. | T2 = 332° C. | T3 = 342° C. |
|---|---|---|---|
| % weight loss | 2.0 | 5.0 | 10.0 |

DSC analysis indicates that the Tg is at 146° C. The molecular weight was determined by HT GPC as set forth above and was estimated at 56,900 (Mw) and the number average of the molecular weight at 6040 (Mn). The residual monomer was less than 0.8%.

Example 3

Polymerization of Pentabromobenzyl Acrylate

Reaction medium: ethyleneglycol diethylacetate/water mixture (3:1)
Initiator: ammonium persulfate The procedure of Example 1 was repeated, but this time the organic solvent was ethyleneglycol diethylacetate instead of ethyleneglycol dimethylether with a reaction temperature of 100° C. during 6 h. The TGA profile of the polymer obtained, its $T_g$ and molecular weights are set out below.

TABLE 3

| temperature | T1 = 327° C. | T2 = 339° C. | T3 = 348° C. |
|---|---|---|---|
| % weight loss | 2.0 | 5.0 | 10.0 |

$T_g$ was estimated at 164° C.; Mw = 3,605,000 and Mn = 756,700, such that the PD is 4.76.

Example 4

Polymerization of Pentabromobenzyl Acrylate

Reaction medium: ethyleneglycol diethylacetate/water mixture (3:1)
Initiator: ammonium persulfate
Chain length regulator: dodecylmercaptan The procedure of Example 2 was repeated, but this time the organic solvent was ethyleneglycol diethylacetate instead of ethyleneglycol dimethylether with a reaction temperature of 100° C. during 6 h. The TGA profile of the polymer obtained, its $T_g$ and molecular weights are set out below.

TABLE 4

| temperature | T1 = 320° C. | T2 = 332° C. | T3 = 341° C. |
|---|---|---|---|
| % weight loss | 2.0 | 5.0 | 10.0 |

$T_g$ was estimated at 150° C. Mw = 57,000 and Mn = 12,600, such that the PD is 4.52.

Example 5

Polymerization of Pentabromobenzyl Acrylate

Reaction medium: tetrahydrofurane/water mixture (3:1)
Initiator: ammonium persulfate The procedure of Example 1 was repeated, but this time the organic solvent was tetrahydrofurane instead of ethyleneglycol dimethylether with a reaction temperature of 65° C. during 8 h. The TGA profile of the polymer obtained, its $T_g$ and molecular weights are set out below.

TABLE 5

| temperature | T1 = 318° C. | T2 = 329° C. | T3 = 338° C. |
|---|---|---|---|
| % weight loss | 2.0 | 5.0 | 10.0 |

$T_g$ was estimated at 151° C.; Mw = 102,000 and Mn = 16,500, such that the PD is 6.2.

Example 6

Polymerization of Pentabromobenzyl Acrylate

Reaction medium: tetrahydrofurane/water mixture (3:1)
Initiator: ammonium persulfate
Chain length regulator: dodecylmercaptan The procedure of Example 2 was repeated, but this time the organic solvent was tetrahydrofurane instead of ethyleneglycol dimethylether with a reaction temperature of 65° C. during 8 h. The TGA profile of the polymer obtained, its $T_g$ and molecular weights are set out below.

TABLE 6

| temperature | T1 = 314° C. | T2 = 327° C. | T3 = 336° C. |
|---|---|---|---|
| % weight loss | 2.0 | 5.0 | 10.0 |

$T_g$ was estimated at 135° C. Mw = 27,300 and Mn = 13,000, such that the PD is 2.1.

Example 7

Polymerization of Pentabromobenzyl Acrylate

Reaction medium: 1,4-dioxane/water mixture (3:1)
Initiator: ammonium persulfate

The procedure of Example 1 was repeated, but this time the organic solvent was 1,4-dioxane instead of ethyleneglycol dimethylether with a reaction temperature of 80° C. during 6 h. The TGA profile of the polymer obtained, its $T_g$ and molecular weights are set out below.

TABLE 7

| temperature | T1 = 308° C. | T2 = 327° C. | T3 = 338° C. |
|---|---|---|---|
| % weight loss | 2.0 | 5.0 | 10.0 |

$T_g$ was estimated at 171° C.; Mw = 449,700 and Mn = 101,100, such that the PD is 4.4.

Example 8

Polymerization of Pentabromobenzyl Acrylate

Reaction medium: 1,4-dioxane/water mixture (3:1)
Initiator: ammonium persulfate
Chain length regulator: dodecylmercaptan The procedure of Example 2 was repeated, but this time the organic solvent was 1,4-dioxane instead of ethyleneglycol dimethylether with a reaction temperature of 80° C. during 6 h. The TGA profile of the polymer obtained, its $T_g$ and molecular weights are set out below.

TABLE 8

| temperature | T1 = 314° C. | T2 = 327° C. | T3 = 336° C. |
|---|---|---|---|
| % weight loss | 2.0 | 5.0 | 10.0 |

$T_g$ was estimated at 141° C. Mw = 63,900 and Mn = 16,700, such that the PD is 3.82.

Example 9

Polymerization of Pentabromobenzyl Acrylate

Reaction medium: ethyleneglycol dimethylether/water mixture (3:1)
Initiator: ammonium persulfate
Chain length regulator: dodecylmercaptan The procedure of Example 2 was repeated but this time with the following amounts of reactants and reagents:
PBBMA: 250 g; ethyleneglycol dimethylether: 750 ml; water: 250 ml; ammonium persulfate: 2.5 g; 1-dodecanethiol:18.75 g, such that the weight ratio between the initiator and the chain length modifier was 1:7.5. The TGA profile of the polymer obtained, its $T_g$ and molecular weights are set out below.

TABLE 9

| temperature | T1 = 305° C. | T2 = 320° C. | T3 = 330° C. |
|---|---|---|---|
| % weight loss | 2.0 | 5.0 | 10.0 |

$T_g$ was estimated at 70° C. Mw = 11,000 and Mn = 4,400, such that the PD is 2.5.

Example 10

Polymerization of Pentabromobenzyl Acrylate

Reaction medium: ethyleneglycol dimethylether/water mixture (3:1)
Initiator: ammonium persulfate
Chain length regulator: dodecylmercaptan The procedure of Example 2 was repeated but this time with the following amounts of reactants and reagents:
PBBMA: 250 g; ethyleneglycol dimethylether: 750 ml; water: 250 ml; ammonium persulfate: 2.5 g; 1-dodecanethiol:43.75 g, such that the weight ratio between the initiator and the chain length modifier was 1:17.5. The TGA profile of the polymer obtained, its $T_g$ and molecular weights are tabulated below.

TABLE 10

| temperature | T1 = 288° C. | T2 = 311° C. | T3 = 325° C. |
|---|---|---|---|
| % weight loss | 2.0 | 5.0 | 10.0 |

$T_g$ was estimated at 20° C. Mw = 5,000 and Mn = 2,300, such that the PD is 2.0.

Example 11

Polymerization of Pentabromobenzyl Acrylate

Reaction medium: ethyleneglycol dimethylether/water mixture (3:1)
Initiator: ammonium persulfate
Chain length regulator: dodecylmercaptan The procedure of Example 2 was repeated but this time with the following amounts of reactants and reagents:
PBBMA: 250 g; ethyleneglycol dimethylether: 750 ml; water: 250 ml; ammonium persulfate: 2.5 g; 1-dodecanethiol:1.25 g, such that the weight ratio between the initiator and the chain length modifier was 1:0.5. The TGA profile of the polymer obtained, its $T_g$ and molecular weights are tabulated below.

TABLE 11

| temperature | T1 = 319° C. | T2 = 329° C. | T3 = 338° C. |
|---|---|---|---|
| % weight loss | 2.0 | 5.0 | 10.0 |

$T_g$ was estimated at 149° C. Mw = 84,000 and Mn = 21,000, such that the PD is 4.

Example 12

Polymerization of Pentabromobenzyl Acrylate

Reaction medium: ethyleneglycol dimethylether/water mixture (3:1)
Initiator: ammonium persulfate
Chain length regulator: Irganox1010

A 250 L reactor equipped with mechanical stirrer, condenser and thermometer was charged with 20 g of PBBMA, 30 ml of ethyleneglycol dimethylether and 10 ml of water. To this mixture was added 0.2 g of ammonium persulfate and 0.2 g of Irganox1010 and the contents of the reactor was heated to reflux (80° C.). The reaction was monitored by HPLC by consumption of the PBBMA. After 4 hours, the reaction was over. After cooling at room temperature, the solid is filtered, washed with water and dried to constant weight in an oven vacuum at 120° C., giving PBBPA in 96.5% yield. The TGA profile of the polymer obtained, its $T_g$ and molecular weights are set out below.

TABLE 12

| temperature | T1 = 333° C. | T2 = 342° C. | T3 = 350° C. |
|---|---|---|---|
| % weight loss | 2.0 | 5.0 | 10.0 |

$T_g$ was estimated at 174° C. Mw = 197,000 and Mn = 19,900, such that the PD is 9.9. The residual monomer was less than 0.5%.

Example 13

Polymerization of Pentabromobenzyl Methacrylate

Reaction medium: ethyleneglycol dimethylether/water mixture (3:1)
Initiator: ammonium persulfate The procedure of Example 1 was repeated, but this time the monomer that underwent polymerization was pentabromobenzyl methacrylate, with a reaction temperature of 80°

C. for 10 h. The TGA profile of the polymer obtained, its $T_g$ and molecular weights are set out below.

TABLE 13

| temperature | T1 = 260° C. | T2 = 276° C. | T3 = 293° C. |
|---|---|---|---|
| % weight loss | 2.0 | 5.0 | 10.0 |

$T_g$ was estimated at 165° C.; Mw = 163,000 and Mn = 21,000, such that the PD is 7.75.

Example 14

Polymerization of Pentabromobenzyl Methacrylate

Reaction medium: ethyleneglycol dimethylether/water mixture (3:1)
Initiator: ammonium persulfate
Chain length regulator: dodecylmercaptan The procedure of Example 2 was repeated, but this time the monomer that underwent polymerization was pentabromobenzyl methacrylate with a reaction temperature of 80° C. for 10 h. The TGA profile of the polymer obtained, its $T_g$ and molecular weights are set out below.

TABLE 14

| temperature | T1 = 288° C. | T2 = 299° C. | T3 = 313° C. |
|---|---|---|---|
| % weight loss | 2.0 | 5.0 | 10.0 |

$T_g$ was estimated at 182° C. Mw = 83,100 and Mn = 13,500, such that the PD is 6.15.

Example 15

Copolymerization of Pentabromobenzyl Acrylate and Styrene

Reaction medium: ethyleneglycol dimethylether/water mixture (3:1)
Initiator: ammonium persulfate A 2 L reactor equipped with mechanical stirrer, condenser and thermometer was charged with 475 g of PBBMA, 25 g of styrene, 750 ml of ethyleneglycol dimethylether and 250 ml of water. To this mixture was added 5 g of ammonium persulfate and the contents of the reactor was heated to reflux (80° C.). The reaction was monitored by HPLC by consumption of the PBBMA. After four hours, the reaction was over. After cooling at room temperature, the solid is filtrated, washed with water and dried to constant weight in an oven vacuum at 120° C., giving the copolymer in almost quantitative yield. The bromine content as determined by parrbomb method is 66.5%.

TGA analysis indicates that under heating rate of 10° C./min in air atmosphere, the copolymer undergoes the following weight losses:

TABLE 15

| temperature | T1 = 320° C. | T2 = 335° C. | T3 = 344° C. |
|---|---|---|---|
| % weight loss | 2.0 | 5.0 | 10.0 |

$T_g$ was estimated at 154° C. Mw = 173,000 and Mn = 33390, such that the PD is 5.1. The residual monomer was less than 0.5%.

Example 16

Copolymerization of Pentabromobenzyl Acrylate and Styrene

Reaction medium: ethyleneglycol dimethylether/water mixture (3:1)
Initiator: ammonium persulfate
Chain length regulator: dodecylmercaptan A 2 L reactor equipped with mechanical stirrer, condenser and thermometer was charged with 475 g of PBBMA, 25 g styrene, 750 ml of ethyleneglycol dimethylether and 250 ml of water. To this mixture was added 5 g of ammonium persulfate and 5 g of dodecylmercaptan and the contents of the reactor was heated to reflux (80° C.). The reaction was monitored by HPLC by consumption of the PBBMA. After four hours, the reaction was over. After cooling at room temperature, the solid is filtrated, washed with water and dried to constant weight in an oven vacuum at 120° C., giving the copolymer in almost quantitative yield.

TGA analysis indicates that under heating rate of 10° C./min in air atmosphere, the copolymer undergoes the following weight losses:

TABLE 16

| temperature | T1 = 318° C. | T2 = 335° C. | T3 = 345° C. |
|---|---|---|---|
| % weight loss | 2.0 | 5.0 | 10.0 |

$T_g$ was estimated at 137° C. Mw = 58,700 and Mn = 16300, such that the PD is 3.6. The residual monomer was less than 0.5%.

Example 17

V-0 Rated Flame Retarded Formulations of Polypropylene Impact Copolymers

The PBBPA of the invention was tested in compositions of polypropylene impact copolymers according to the procedure described below.

Ingredients of the Compositions

The materials used for preparing the polypropylene compositions are tabulated in Table 17:

TABLE 17

| Component (manufacturer) | GENERAL DESCRIPTION | FUNCTION |
|---|---|---|
| PP Capilene SL-50 (Caol) | polypropylene impact copolymer | plastic matrix |
| PBBPA of Example 2 | FR | flame retardant |
| Ultratalc 609 (Barrels Minerals) | Talc | Filler |
| M0112 (Kafrit) | Antimony trioxide masterbatch which contains 80 wt % $Sb_2O_3$ | FR synergist |
| Irganox B 225 (Ciba) | Antioxidant/processing stabilizer | Antioxidant & heat stabilizer. |

Preparation of Compositions and Test Specimens

The ingredients were fed into a twin-screw co-rotating extruder ZE25 with L/D=32 through its main feeding port with the temperature settings being between 80° C. and 220° C. The screw speed was 350 rpm, and the feeding rate was 15 kg per hour. More specific conditions are presented in Table 18:

TABLE 18

| PARAMETER | UNITS | Set values |
|---|---|---|
| Screws | | Medium shear A |
| Feeding zone temperature ($T_1$) | ° C. | no heating |
| $T_2$ | ° C. | 80 |
| $T_3$ | ° C. | 180 |
| $T_4$ | ° C. | 190 |
| $T_5$ | ° C. | 190 |
| $T_6$ | ° C. | 200 |
| $T_7$ | ° C. | 200 |
| $T_8$ | ° C. | 210 |
| $T_9$ | ° C. | 220 |
| Screw speed | RPM | 350 |
| Feeding rate | Kg/h | 15 |

The strands produced were pelletized in a pelletizer 750/3 from Accrapak Systems Ltd. The resultant pellets were dried in a circulating air oven at 75° C. for 4 hours. The dried pellets were injection molded into test specimens using Allrounder 500-150 from Arburg as tabulated Table in 19.

TABLE 19

| PARAMETER | UNITS | Set values |
|---|---|---|
| $T_1$ (Feeding zone) | ° C. | 190 |
| $T_2$ | ° C. | 200 |
| $T_3$ | ° C. | 210 |
| $T_4$ | ° C. | 220 |
| $T_5$ (nozzle) | ° C. | 230 |
| Mold temperature | ° C. | 15 |
| Injection pressure | bar | 600 |
| Holding pressure | bar | 600 |
| Back pressure | bar | 10 |
| Holding time | sec | 5 |
| Cooling time | sec | 15 |
| Mold closing force | kN | 500 |
| Filling volume (portion) | ccm | 45 |
| Injection speed | ccm/sec | 30 |

The specimens were conditioned for one week at 23° C., and were then subjected to the tests outlined below.

Tests

Flammability Test

The flammability test was carried out according to the Underwriters-Laboratories standard UL 94, applying the vertical burn on specimens of 1.6 mm thickness.

Mechanical Properties

Impact strength was measured using the Izod notched test according to ASTM D-256-81, using pendulum impact tester type 5102 (Zwick); Tensile properties (tensile strength, tensile modulus and elongation at break) were measured in Zwick 1435 material testing machine according to ASTM D-638-95.

Thermal Properties

HDT (heat distortion temperature; this is the temperature at which a polymer sample deforms under a specific load) was measured according to ASTM D-648 with load of 1820 kPa and heating rate 2° C./min; MFI (melt flow index) was determined according to ASTM D-1238.

The compositions tested and the results are set out in Table 20.

TABLE 20

| Example | 17 |
|---|---|
| Composition (by weight %): | |
| Polypropylene impact copolymer | 48.8 |
| PBBPA of Example 2 | 23.9 |
| Talc | 20 |
| Antimony trioxide masterbatch | 7.1 |
| Irganox B 225 | 0.2 |
| Bromine content, % calculated | 17 |
| Antimony trioxide, % calculated | 5.7 |
| Properties: | |
| Flammability test: | |
| UL-94 vertical burning test at 1.6 mm thickness | |
| Total flaming time (sec) | 14 |
| Maximal Flaming time (sec) | 4 |
| Maximal glowing time + second flaming (sec) | 29 |
| Number of dripping | 0 |
| Number of cotton ignition | 0 |
| Burning to the clamp | 0 |
| Rating | V-0 |
| Mechanical properties: | |
| Impact strength (Izod notched J/m) | 22 |
| Tensile strength (N/mm$^2$) | 23 |

TABLE 20-continued

| Example | 17 |
|---|---|
| Elongation at break (%) | 3 |
| Tensile modulus (N/mm$^2$) | 2960 |
| Thermal properties: | |
| HDT as molded (° C.) | 71 |
| MVI (230° C./2.16 kg) cm$^3$/10 min | 3.8 |
| MFI (230° C./2.16 kg) g/10 min | 4.4 |

Example 18

V-2 Rated Flame Retarded Formulations of Polypropylene Impact Copolymers

The procedures set forth above were repeated to produce V-2 rated formulation. Notably, the target was achieved using a relatively low amount of a combination consisting of (i) PBBPA (ii) antimony trioxide, with the bromine and antimony trioxide concentrations in the formulation being only 8 wt % and 2.7 wt %, respectively. The results are tabulated in Table 21.

TABLE 21

| Example | 18 |
|---|---|
| Composition (by weight %): | |
| Polypropylene impact copolymer | 85.2 |
| PBBPA of Example 2 | 11.3 |
| Antimony trioxide masterbatch | 3.3 |
| Irganox B 225 | 0.2 |
| Bromine content, % calculated | 8 |
| Antimony trioxide, % calculated | 2.7 |
| Properties: | |
| Flammability test: | |
| UL-94 vertical burning test at 1.6 mm thickness | |
| Total flaming time (sec) | 102 |
| Maximal Flaming time (sec) | 24 |
| Number of dripping | 5 |
| Number of cotton ignition | 5 |
| Burning to the clamp | 0 |
| Rating | V-2 |

Examples 19 and 20 (of the Invention) and 21 (Comparative)

V-0 Rated Flame Retarded Formulations of Talc-Free Polypropylene Impact Copolymers In the following set of examples, the performance of PBBPA of the invention in polypropylene copolymers was investigated and compared with the commercially available FR 1025 product. The ingredients employed, compounding and injection molding parameters of the test specimen are as described in Example 17. The compositions prepared and results of the flammability test are tabulated in Table 22, together with some mechanical properties of interest.

TABLE 22

| Example | 19 | 20 | 21 |
|---|---|---|---|
| Composition (by weight %): | | | |
| PP SL 50 | 56.5 | 53.4 | 54.6 |
| FR of Example 9 | 31.6 | | |
| FR of Example 2 | | 34.2 | |

TABLE 22-continued

| Example | 19 | 20 | 21 |
|---|---|---|---|
| FR 1025 | | | 32.4 |
| Antimony trioxide masterbatch (90% $Sb_2O_3$) | 11.7 | 12.2 | 12.8 |
| Irganox B 225 | 0.2 | 0.2 | 0.2 |
| Bromine content, % calculated | 21 | 22 | 23 |
| Antimony trioxide, % calculated | 10.5 | 11 | 11.5 |
| Properties: | | | |
| Flammability test: | | | |
| UL-94 vertical burning test at 1.6 mm thickness | | | |
| Total flaming time (sec) | 28 | 16 | 51 |
| Maximal Flaming time (sec) | 9 | 4 | 13 |
| Maximal flaming + glowing time (sec) | 3 | ND | 50 |
| Number of specimen dripping | 5 | 1 | 5 |
| Number of cotton ignition | 0 | 0 | 0 |
| Rating | V-0 | V-0 | V-1 |
| Mechanical properties: | | | |
| Impact strength (Izod notched J/m) | 50 | 23 | 41 |
| Tensile strength (N/mm$^2$) | 19 | 22.6 | 24 |
| Elongation at yield % | 2.5 | 1.9 | 2.3 |
| Elongation at break (%) | 21.4 | 2.4 | 9.7 |
| Tensile modulus (N/mm$^2$) | 1526 | 1719 | 1695 |

The results shown in Table 22 illustrate that PBBPA with molecular weight of 11,000 performs well in talc-free polypropylene, achieving the UL 94 classification with 2:1 weight ratio relative to the antimony trioxide synergist while the total concentration of bromine and the synergist is below 33 wt %.

Examples 22-23

HIPS Compositions which are Flame-Retarded with PBBPA in the Presence of Low Amount of Antimony Trioxide (<2.0 wt %)

The PBBPA of the invention were tested in HIPS compositions according to the procedure set out below below.

Ingredients of the Compositions

The materials used for preparing the polypropylene compositions are tabulated in Table 23:

TABLE 23

| Component (manufacturer) | GENERAL DESCRIPTION | FUNCTION |
|---|---|---|
| HIPS Styron 1200 (Dow) | High impact polystyrene | plastic matrix |
| The product of Example 2 | FR | flame retardant |
| The product of Example 11 | FR | flame retardant |
| A0112 (Kafrit) | Antimony trioxide masterbatch which contains 80 wt % $Sb_2O_3$ | FR synergist |
| Hostaflon 2017 (Dyneon) | PTFE | Anti-dripping agent |
| Irganox B 225 (Ciba) | Phenol:phosphite 3:1 based stabilizer | Antioxidant & heat stabilizer. |

Preparation of the Compositions and Test Specimens

The ingredients were fed into a twin-screw co-rotating extruder ZE25 with L/D=32 through its main feeding port with the temperature settings being between 180° C. and 220° C. The screw speed was 350 rpm, and the feeding rate was 15 kg per hour. More specific conditions are presented in Table 24:

TABLE 24

| PARAMETER | UNIT | SET VALUES |
|---|---|---|
| Screws | | Medium Shear A |
| Feeding zone temperature ($T_1$) | ° C. | No heating |
| $T_2$ | ° C. | 80 |
| $T_3$ | ° C. | 180 |
| $T_4$ | ° C. | 190 |
| $T_5$ | ° C. | 190 |
| $T_6$ | ° C. | 200 |
| $T_7$ | ° C. | 200 |
| $T_8$ | ° C. | 210 |
| $T_9$ | ° C. | 220 |
| Screw speed | RPM | 350 |
| Feeding rate | Kg/h | 15 |

The strands produced were pelletized in a pelletizer 750/3 from Accrapak Systems Ltd. The resultant pellets were dried in a circulating air oven at 75° C. for 4 hours. The dried pellets were injection molded into test specimens using Allrounder 500-150 from Arburg under the conditions tabulated below:

TABLE 25

| PARAMETER | UNITS | Set values |
|---|---|---|
| $T_1$ (Feeding zone) | ° C. | 200 |
| $T_2$ | ° C. | 200 |
| $T_3$ | ° C. | 210 |
| $T_4$ | ° C. | 210 |
| $T_5$ (nozzle) | ° C. | 220 |
| Mold temperature | ° C. | 30 |
| Injection pressure | bar | 900 |
| Holding pressure | bar | 800 |
| Back pressure | bar | 50 |
| Holding time | sec | 4 |
| Cooling time | sec | 12 |
| Mold closing force | kN | 500 |
| Filling volume (portion) | ccm | 38 |
| Injection speed | ccm/sec | 25 |

The specimens were conditioned for one week at 23° C., and were then subjected to the several tests to determine their properties. The compositions tested and the results are set out in Table 26.

TABLE 26

| Example | 22 | 23 |
|---|---|---|
| Composition (by weight %): | | |
| HIPS | 79.5 | 79.5 |
| PBBPA of Example 2 | 18.3 | |
| PBBPA of Example 11 | | 18.3 |
| Antimony trioxide masterbatch | 1.9 | 1.9 |
| PTFE | 0.1 | 0.1 |
| Irganox B 225 | 0.2 | 0.2 |
| Bromine content, % calculated | 13 | 13 |
| Antimony trioxide, % calculated | 1.5 | 1.5 |
| Properties: | | |
| Flammability test: | | |
| UL-94 vertical burning test at 1.6 mm thickness | | |
| Total flaming time (sec) | 21 | 26 |
| Maximal Flaming time (sec) | 5 | 10 |
| Maximal glowing time + second flaming (sec) | 0 | 15 |
| Number of specimen | 5 | 5 |
| Number of dripping | 0 | 0 |
| Number of cotton ignition | 0 | 0 |
| Burning to the clamp | 0 | 0 |
| Rating | V-0 | V-0 |

TABLE 26-continued

| Example | 22 | 23 |
|---|---|---|
| Mechanical properties: | | |
| Impact strength (Izod notched J/m) | 53 | 56 |
| Tensile strength (N/mm$^2$) | 25 | 25 |
| Elongation at break (%) | 59 | 61 |
| Tensile modulus (N/mm$^2$) | 1835 | 1834 |
| Thermal properties: | | |
| HDT as molded (° C.) | 72 | 72 |
| MVI (230° C./2.16 kg) cm$^3$/10 min | 5.8 | 5.3 |
| MFI (230° C./2.16 kg) g/10 min | 6.4 | 5.6 |

The results show that poly (pentabromobenzyl acrylate) with 30,000-80,000 Mw and narrow molecular weight distribution (PD less than 10) demonstrates good activity in HIPS under low, normally unworkable, antimony trioxide concentration range {i.e., [Sb$_2$O$_3$]<2 wt %.}, reaching UL 94 V-0 classification with only 13 wt % bromine present in the HIPS composition.

Examples 24-29

HIPS Compositions which are Flame-Retarded with PBBPA in the Presence of Especially Low Amount of Antimony Trioxide (<1.5 wt %)

The following study was conducted to assess the performance of PBBPA of the invention in HIPS in the presence of exceptionally low amount of antimony trioxide, i.e., less than 1.5 wt % Sb$_2$O$_3$ in the HIPS composition. The HIPS compositions were prepared as set forth in previous examples. The results are shown in Table 27.

TABLE 27

| Example | 24 | 25 | 26 | 27 | 28 |
|---|---|---|---|---|---|
| Composition (by weight %): | | | | | |
| HIPS | 80 | 80.3 | 80 | 78 | 75 |
| PBBPA of Example 2 | 18.0 | 18.0 | | 21 | 24 |
| PBBPA of Example 11 | | | 18.0 | | |
| Antimony trioxide masterbatch | 1.6 | 1.3 | 1.6 | 0.9 | 0.6 |
| PTFE | 0.1 | 0.1 | 0.1 | 0.1 | 0.1 |
| Irganox B 225 | 0.2 | 0.2 | 0.2 | 0.2 | 0.2 |
| Bromine content, % calculated | 13 | 13 | 13 | 15 | 17 |
| Antimony trioxide, % calculated | 1.25 | 1.0 | 1.25 | 0.75 | 0.5 |
| Br/Sb2O3 weight ratio | 10 | 13 | 10 | 20 | 34 |
| Properties: | | | | | |
| Flammability test: | | | | | |
| UL-94 vertical burning test at 1.6 mm thickness | | | | | |
| Total flaming time (sec) | 14 | 30 | 18 | 13 | 10 |
| Maximal Flaming time (sec) | 5 | 10 | 3 | 3 | 1 |
| Maximal glowing time + second flaming (sec) | 5 | 0 | 5 | 0 | 0 |
| Number of specimen | 5 | 5 | 5 | 5 | 5 |
| Number of dripping | 0 | 0 | 0 | 0 | 0 |
| Number of cotton ignition | 0 | 0 | 0 | 0 | 0 |
| Burning to the clamp | 0 | 0 | 0 | 0 | 0 |
| Rating | V-0 | V-0 | V-0 | V-0 | V-0 |
| Mechanical properties | | | | | |
| Impact strength (Izod notched J/m) | 55 | 60 | 57 | 59 | 52 |
| Tensile strength (N/mm$^2$) | 25 | 25 | 25 | ND | ND |
| Elongation at break (%) | 66 | 59 | 59 | ND | ND |
| Tensile modulus (N/mm$^2$) | 1943 | 1935 | 1935 | ND | ND |

TABLE 27-continued

| Example | 24 | 25 | 26 | 27 | 28 |
|---|---|---|---|---|---|
| Thermal properties: | | | | | |
| HDT as molded (° C.) | 75 | 75 | 75 | ND | ND |
| MFI (230° C./2.16 kg) g/10 min | 6 | 6 | 6 | ND | ND |

The results shown in Table 27 demonstrate that the PBBPA of the invention performs very well even if the amount of the antimony trioxide is decreased to below 1.5 wt %, e.g., within the range from 0.5 to 1.5 wt %, as shown in FIG. 2, where the results based on Examples 22-28 are graphically presented by plotting Bromine$_{(PBBPA)}$ versus [Sb$_2$O$_3$] together with the comparative date based on WO 2010/10561.

Examples 29-32 of the Invention) and 33 (Comparative)

Preparation of Aqueous Dispersions of PBBPA Suitable for Padding and Back-Coating Applications and their Use in Textile Products In the following study, PBBPA of Example 2 was tested for its utility in reducing the flammability of textile products. Several formulation were prepared employing the general procedure set forth below.

The aforementioned PBBPA was milled using Micronizer Jet Mill. The particle size distribution before and after milling were measured using Malvern Mastersizer 2000 in water (3 minutes ultrasonic treatment, 500 psi, 1250 rpm).

The PBBPA (50 g) with a size distribution of d$_{50}$<10 micron d$_{90}$<15 micron D$_{99}$<35 micron was added to a mixed solution containing deionized water (443.8 g), a dispersing agent (Tersperse 2735 available from Huntsman; 5 g) and a wetting agent (Morewet EFW available from AkzoNobel; 0.5 g). The dispersion was allowed to mix for thirty minutes, followed by the addition of antimony trioxide (purchased from Campine Belfium; 21 g) and an acrylic binder (AC-170 from B. G. Polymers). Two types of formulations were prepared: with low content binder and high content binder, which comprise 35.9 g and 71 g of the acrylic binder, respectively.

The dispersion was allowed to mix for additional fifteen minutes and was then thickened by adding a small amount of hydroxyethylcellulose (GP acrylic thickening, also from B. G. Polymers; 1.7 g).

For comparative purpose, a formulation which contains FR 1025 was also prepared using the procedure described above. The amount of FR 1025 used (with d$_{50}$<10 μm and d$_{90}$<15 μm) was 70 g. The amounts of antimony trioxide and acrylic binder added to the aqueous dispersion were 30.2 g and 50.1 g, respectively.

The compositions of the formulations prepared are set forth below in Table 28.

TABLE 28

| Composition | Example 29 | Example 30 | Example 31 | Example 32 | Example 33 comparative |
|---|---|---|---|---|---|
| Dry solids (wt %) | 30 | 30 | 32 | 50 | 32 |
| Flame retardant (wt %) | 13.6 | 16.2 | 17.2 | 29.8 | 17.3 |
| Br (wt %) | 9.6 | 11.4 | 12.2 | 21.2 | 12.3 |

TABLE 28-continued

| Composition | Example 29 | Example 30 | Example 31 | Example 32 | Example 33 comparative |
|---|---|---|---|---|---|
| Acrylic binder (wt %) | 19.46 | 11.6 | 12.3 | 10.7 | 12.4 |
| $Sb_2O_3$ (wt %) | 5.8 | 7.1 | 7.5 | 12.9 | 7.5 |
| Dispersion agent (wt %) | 0.8 | 0.9 | 1 | 1.7 | 1 |

Different fabrics, as described in more detail below, were treated with the formulations described in Table 28 (applied to the fabric either by padding or as back-coating) and were subjected to the ASTM D 6413 12 seconds ignition test. According to the test, a vertically positioned sample placed in a flame chamber is exposed to flame for 12 seconds. After the exposure, the post-flame burning time, afterglow and the length of char are measured and recorded. To pass, the average char length of five samples cannot exceed 7 inches (17.8 cm); none of the individual specimens can have a char length of more than 10 inches (25.4 cm); the post "after flame time" is less than 5 seconds, and its "after glow time" is less than 150 seconds, so as to render the sample applicable even in the stricter "children's nightwear" flammability standards.

The foregoing flammability test was carried out before and after five successive laundry cycles. In each laundry cycle, the temperature of the washing water is maintained between 58° C. and 62° C., for automatic washing machines, the washing cycle is set for normal washing cycle, and a synthetic detergent that conforms to Standard Laboratory Practice for Home Laundering (AATCC technical manual/2001) is used. Following the five successive laundry cycles, the fabric is dried in accordance with commonly used drying procedure, based on the Standard Laboratory Practice for Home Laundering (AATCC technical manual/2001).

The formulation of Example 29 was applied by means of padding to polyester/cotton (50/50) blended fabric. The amount of formulation added to the fabric was measured, and the quantities of bromine and antimony trioxide incorporated into the fabric were calculated. The sample was subjected to the flammability test. The results are set forth in Table 29.

TABLE 29

|  | % add-on | % FR | % Br | % $Sb_2O_3$ | Flammability test | | |
|---|---|---|---|---|---|---|---|
|  |  |  |  |  | After flame (s) | After glow (s) | Char length (cm) |
| Before laundry | 20.4 | 9.3 | 6.6 | 4.0 | 0 | 110 | 14 |
| Five laundries | 20.4 | 9.3 | 6.6 | 4.0 | 1 | 79 | 15 |

The formulation of Example 30 was applied by means of padding to polyester/cotton (50/50) blended fabric. The amount of formulation added to the fabric was measured, and the quantities of bromine and antimony trioxide incorporated into the fabric were calculated. The sample was subjected to the flammability test. The results are set forth in Table 30.

TABLE 30

|  | % add-on | % FR | % Br | % $Sb_2O_3$ | Flammability test | | |
|---|---|---|---|---|---|---|---|
|  |  |  |  |  | After flame (s) | After glow (s) | Char length (cm) |
| Before laundry | 22.6 | 12.2 | 8.8 | 5.3 | 0 | 142 | 13.5 |
| Five laundries | 22.6 | 12.2 | 8.8 | 5.3 | 1 | 60 | 16.5 |

The formulation of Example 31 was applied by means of padding to polyester (100%) knit. The amount of formulation added to the fabric was measured, and the quantities of bromine and antimony trioxide incorporated into the fabric were calculated. The sample was subjected to the flammability test. The results are set forth in Table 31.

TABLE 31

|  | % add-on | % FR | % Br | % $Sb_2O_3$ | Flammability test | | |
|---|---|---|---|---|---|---|---|
|  |  |  |  |  | After flame (s) | After glow (s) | Char length (cm) |
| Before laundry | 26.2 | 14.1 | 10.1 | 6.1 | 0 | 0 | 12.5 |
| Five laundries | 26.2 | 14.1 | 10.1 | 6.1 | 0 | 0 | 14.5 |

The formulation of Example 32 was applied as back-coating to polyester/cotton (50/50) blended woven fabric and by means of padding to cotton (100%) knit. The amount of formulation added to the fabric was measured, and the quantities of bromine and antimony trioxide incorporated into the fabric were calculated. The sample was subjected to the flammability test. The results are set forth in Tables 32A (back-coating onto polyester/cotton (50/50)) and 32B (cotton, padding), respectively.

TABLE 32A

|  | % add-on | % FR | % Br | % $Sb_2O_3$ | Flammability test | | |
|---|---|---|---|---|---|---|---|
|  |  |  |  |  | After flame (s) | After glow (s) | Char length (cm) |
| Before laundry | 27.8 | 16.6 | 11.9 | 7.2 | 0 | 65 | 11.75 |

TABLE 32B

|  | % add-on | % FR | % Br | % $Sb_2O_3$ | Flammability test | | |
|---|---|---|---|---|---|---|---|
|  |  |  |  |  | After flame (s) | After glow (s) | Char length (cm) |
| Before laundry | 25.5 | 13.8 | 9.9 | 6.0 | 0 | 122 | 9 |

For the purpose of comparison, the formulation of Example 33, where the flame retardant is FR-1025, was applied on by means of padding to polyester/cotton (50/50) blended knit fabric and polyester (100%) knit. Several samples were prepared, with the FR-1025 concentration being in the range from 13.8 to 21.9. In all cases, the FR-1025 containing samples failed to pass the flammability tests following the laundry stage.

Example 34

Determining the Presence of the End Group(s) of PBBPA Chains

The structure of one repeating unit of the polymer, covalently attached to an end dodecyl thiol group is shown below:

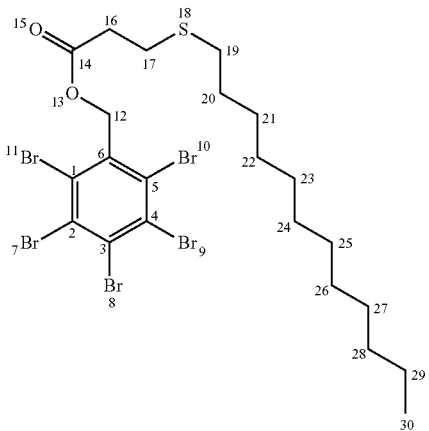

$^1$H-NMR was used to elucidate the structure of the PBBPA of the invention. $^1$H-NMR spectrum was obtained using Bruker AVANCE III 500 MHz instrument. The solvent was deuterated bromobenzene. The main features of the spectrum are tabulated in Table 33:

TABLE 33

| Chemical shifts δ ± 0.01 ppm | Multiplicity | Assignment |
|---|---|---|
| 1.82 | multiplet | 20-29 |
| 6.1 | multiplet | 12 |

The invention claimed is:

1. Poly (pentabromobenzyl acrylate) having weight average molecular weight (Mw) in the range from 4,000 to 120,000 and polydispersity index of less than 10 as determined by high temperature gel permeation chromatography, wherein the glass transition temperature of the poly (pentabromobenzyl acrylate) is not more than 150 C.°, the poly (pentabromobenzyl acrylate) comprising chains which are terminated by an end group derived from a chain length regulator, wherein the end group is a thiol group —SR$_1$, and wherein R$_1$ is a linear or branched alkyl group composed of not less than 8 carbon atom.

2. Poly (pentabromobenzyl acrylate) according to claim 1, wherein the Mw is in the range from 4,000 to 90,000, the polydispersity index is between 2 and 10 and the glass transition temperature is between 20 and 150° C.

3. Poly (pentabromobenzyl acrylate) according to claim 2, wherein the Mw is in the range from 4,000 to 30,000 and the glass transition temperature is between 20 and 135° C.

4. Poly (pentabromobenzyl acrylate) according to claim 2, wherein the Mw is in the range from 30,000 to 90,000 and the glass transition temperature is between 135 and 150° C.

5. Poly (pentabromobenzyl acrylate) according to claim 4, wherein the Mw is in the range from 40,000 to 90,000 and the glass transition temperature is between 140 and 150° C.

6. Poly (pentabromobenzyl acrylate) according to claim 1, wherein the end group is —S(CH$_2$)$_n$CH$_3$ with n ranging from 8 to 20.

7. A formulation which comprises a flammable material and the poly (pentabromobenzyl acrylate) as defined in claim 1 as a flame retardant.

8. A formulation according to claim 7, wherein the flammable material is a polypropylene copolymer or impact modified polypropylene.

9. A formulation according to claim 8, which further comprises antimony trioxide, wherein the bromine content of the formulation is in the range from 7 to 10 wt % and and a weight ratio of bromine to Sb$_2$O$_3$ is less than 4.

10. A formulation according to claim 8, which is a talc-free formulation, comprising poly (pentabromobenzyl acrylate) having weight average molecular weight (Mw) in the range from 4,000 to 30,000 and polydispersity index of between 2 and 10 as determined by high temperature gel permeation chromatography, wherein the glass transition temperature of the poly (pentabromobenzyl acrylate) is between 20 and 135° C. and antimony trioxide, such that the combined concentration of bromine and antimony trioxide relative to the total weight of the formulation is less than 34 wt %, with a weight ratio of bromine to Sb$_2$O$_3$ being not more than 2.

11. A formulation according to claim 7, wherein the flammable material comprises a styrene-containing polymer or copolymer.

12. A formulation according to claim 11, wherein the styrene-containing copolymer is selected from the group consisting of high-impact polystyrene (HIPS) and acrylonitrile butadiene styrene (ABS), wherein said formulation further comprises antimony trioxide at weight concentration of not more than 1.5 wt %.

13. A formulation according to claim 7, wherein the flammable material is a textile product.

14. A formulation according to claim 13, wherein the poly (pentabromobenzyl acrylate) has a weight average molecular weight (Mw) in the range from 30,000 to 90,000 and polydispersity index of between 2 and 10 as determined by high temperature gel permeation chromatography, wherein the glass transition temperature of the poly (pentabromobenzyl acrylate) is between 135 and 150° C.

15. A composition comprising poly (pentabromobenzyl acrylate) according to claim 1, an aqueous carrier and a polymer binder, and optionally one or more additives selected from the group consisting of wetting agents, dispersants and thickeners.

16. A method for reducing the flammability of a textile product, comprising applying poly (pentabromobenzyl acrylate) of claim 4 to said product by padding or coating a surface of said product.

* * * * *